United States Patent
Borghi

(10) Patent No.: US 9,738,220 B2
(45) Date of Patent: Aug. 22, 2017

(54) STEERING WHEEL HAVING INTEGRATED HORN ACTUATOR AND THE METHOD OF OPERATING THE SAME

(71) Applicant: Faraday&Future Inc., Gardena, CA (US)

(72) Inventor: Cory Denis Borghi, Torrance, CA (US)

(73) Assignee: FARADAY & FUTURE, INC., Gardena, CA (US)

( * ) Notice: Subject to any disclaimer, the term of this patent is extended or adjusted under 35 U.S.C. 154(b) by 0 days.

(21) Appl. No.: 14/839,670

(22) Filed: Aug. 28, 2015

(65) Prior Publication Data
US 2017/0057409 A1    Mar. 2, 2017

(51) Int. Cl.
*B60Q 1/00*    (2006.01)
*B60Q 5/00*    (2006.01)

(52) U.S. Cl.
CPC .................. *B60Q 5/003* (2013.01)

(58) Field of Classification Search
CPC ........ A01D 2101/00; A01D 2034/6843; A01D 34/001; A01D 34/6806; A01D 34/69; A01D 34/82; A01D 34/42; A01D 34/43; A01D 34/44; A01D 34/475; A01D 34/63; A01D 34/64; A01D 75/306; B62D 51/04
USPC ....... 340/425.5, 902, 428, 426.15, 445, 463, 340/472, 488, 539.22, 660, 5.61
See application file for complete search history.

(56) References Cited

U.S. PATENT DOCUMENTS

| | | | |
|---|---|---|---|
| 2,946,869 A | 7/1960 | Parks et al. | |
| 5,219,415 A * | 6/1993 | Weinstein ............ | B60Q 1/0082 200/61.54 |
| 5,498,844 A | 3/1996 | Chan | |
| 5,508,482 A | 4/1996 | Martin et al. | |
| 5,576,684 A * | 11/1996 | Langford ................. | B60Q 5/00 338/50 |
| 5,588,673 A * | 12/1996 | Green .................... | B60Q 5/003 200/5 A |
| 5,597,177 A * | 1/1997 | Matsuura ............... | B60Q 5/003 200/61.55 |

(Continued)

*Primary Examiner* — Daniel Previl
(74) *Attorney, Agent, or Firm* — Finnegan, Henderson, Farabow, Garrett & Dunner, LLP

(57) ABSTRACT

A method and apparatus of sounding a horn of a vehicle is provided where the user operator need not release his or her hand from steering wheel handle to actuate a horn. In one example, a steering wheel with force-sensing device is provided for a driver of a car for quick access to sound the horn by simply squeezing or pressing the steer wheel in a particular way without releasing his or her hand from the steering wheel. The vehicle can have a control algorithm to monitor external force applied to the steering wheel through a sensor array which activates the horn when the pressure level reaches a threshold value. Drivers can optionally use a user interface to selectively set one or more threshold values so they can activate the horn or activate different volume or tones of horn by setting and achieving various threshold conditions. The horn may be activated by a squeezing/pressing/twisting action, by squeezing/pressing/twisting the handle with one hand, by squeezing/pressing/twisting the handle with two hands simultaneously, by squeezing/pressing/twisting the handle in a particular way, by squeezing/pressing/twisting the handle at a particular location(s) of the steering wheel handle, etc.

14 Claims, 9 Drawing Sheets

(56) References Cited

U.S. PATENT DOCUMENTS

| | | | | |
|---|---|---|---|---|
| 5,720,493 | A | * | 2/1998 | Sugiyama .............. B60Q 5/003 200/61.54 |
| 5,874,892 | A | * | 2/1999 | Antonellis ............... B60Q 1/52 180/271 |
| 2006/0001392 | A1 | * | 1/2006 | Ajima .................... B62D 5/046 318/432 |
| 2007/0251745 | A1 | * | 11/2007 | Codere ................. B62K 5/027 180/210 |
| 2009/0322064 | A1 | * | 12/2009 | Piotrowski ............ B60R 21/203 280/731 |
| 2012/0299748 | A1 | * | 11/2012 | Reid ...................... B60Q 5/003 340/902 |
| 2014/0081521 | A1 | * | 3/2014 | Frojdh .............. H04M 1/72583 701/36 |

* cited by examiner

STEERING WHEEL HAVING INTEGRATED HORN ACTUATOR AND THE METHOD OF OPERATING THE SAME

FIELD OF THE DISCLOSURE

The field of the disclosure is automotive technology in general and a steering wheel in particular.

BACKGROUND

Machines, including land vehicles and water crafts are typically equipped with horns so that drivers/operators can alarm or signal others when necessary.

In a conventional car for example, horn actuators are located on the center hub of the steering wheel, such as that disclosed by U.S. Pat. No. 5,508,482, which is herein incorporated by reference in its entirety. Horn actuators are also known to be located on the spoke of the steering wheel, such as that disclosed in U.S. Pat. No. 5,498,844, which is herein incorporated by reference in its entirety.

In urgent situations where the driver needs to sound the horn immediately, there is often very little reaction time to move one's hand to press the center hub or horn buttons on the spoke of the steering wheel.

There have been attempts to provide easier and quicker ways to sound a horn. In U.S. Pat. No. 5,498,844, an enlarged horn button overlay is provided to couple over existing horn buttons, so as to provide a larger horn button.

In U.S. Pat. No. 2,946,869, which is incorporated herein by reference in its entirety, a flexible tube embedded with fluid material is provided all around the steering wheel such that when squeezed, the terminal ends of the flexible tube expands, thereby making electrical contact to sound the horn. This mechanism, however, is prone to causing false alarms.

Thus, there is still a need for steering wheels or any controller handle for a machine to have quick access to sounding a horn.

All referenced patents, applications and literatures are incorporated herein by reference in their entirety. Although the present disclosure may obviate one or more of the above-mentioned desires, it should be understood that some aspects of the disclosure may not necessarily obviate them.

BRIEF SUMMARY OF THE DISCLOSURE

According to various embodiments of this disclosure, the contemplated steering wheel may have a hub configured to couple the steering wheel to a steering column of a car; a handle configured for a driver to hold; a spoke connecting the hub and the handle; an external force-sensing device arranged on the handle and configured to electrically connect to a horn of the car, wherein the external force-sensing device has a plurality of pressure sensors.

In one specific embodiment, the pressure sensors can be made of piezoelectric material. In another specific embodiment, the external force-sensing device can be a pressure sensor array composed of the plurality of pressure sensors. In other embodiments, the external force-sensing device can include mechanical buttons. In yet other specific embodiments, the pressure sensors can detect an external force applied to the external force-sensing device by sensing a deformation of at least one of the pressure sensors. In still another specific embodiment, the external force-sensing device can be flexible and wrapped around the handle.

In some preferred embodiments, the external force-sensing device can have two or more sections electrically separate from each other. It can have a threshold circuit coupled with the two or more sections of the external force-sensing device, and the threshold circuit can be turned on only when at least two of the two or more sections of the external force-sensing device detect effective external force at the same time or at about the same time. In some embodiments, the effective external force has to be greater than a threshold value in order to actuate the horn.

In other embodiments, the vehicle can have a user interface allowing the driver/operator to set his or her own threshold value. For example, a driver can train the steering wheel to sound the horn when a certain physical action is applied to the steering wheel.

In some embodiments, the user interface can allow the user/operator to set multiple threshold values. And each threshold value can correspond to a different tone of horn sound, or a different volume of horn sound.

There can be many ways to arrange the external force-sensing device on the handle suitable for each type of machine. In a conventional car steering wheel, the handle is a complete circle surrounding the hub by 360 degrees. In other types of conventional vehicles and machines, the handle can surround the hub by less than 360 degrees. Contemplated embodiments of the disclosure can have a handle that extends around the hub at a predetermined angle, and the coverage rate of the external force-sensing device to the handle can be anywhere between 20-100% of the predetermined angle. In one embodiment, it is at least 50 percent of the predetermined angle. In another embodiment, it is at least 75 percent of the predetermined angle. In yet another embodiment, it is at least 80 percent of the predetermined angle. In still yet another embodiment, it is at least 90 percent of the predetermined angle.

Contemplated steering wheel handle can have the external force-sensing device disposed at various positions on the handle. In one contemplated embodiment, the handle has an inward side facing the hub, and the external force-sensing device can be arranged on the inward side of the handle. In other embodiments, the external force-sensing device can be arranged on the front side (facing the driver) and/or a rear side of the controller handle.

In some contemplated embodiments, the external force-sensing device can electrically couple to the horn by a wire or in a wireless manner. In one embodiment, a wire for an electrical connection between the external force-sensing device and the horn can extend from the external force-sensing device to the hub through the spoke. Alternatively, the external force-sensing device can have a wireless sender capable of sending a signal to a wireless receiver of the horn.

Another aspect of the disclosure includes methods of sounding a horn using a steering wheel handle, wherein the handle has an external force-sensing device disposed thereon, and a driver of the vehicle need not release his or her hand from the steering wheel in order to actuate the horn. As discussed earlier, these contemplated methods can also apply to any industrial machinery or vehicles, including land vehicles, watercrafts, and aircrafts.

The contemplated embodiments include sensing an effective external force applied to the handle by the user's hand, generating a signal when the effective external force is greater than a threshold value, and transmitting the signal to the horn to actuate the horn.

Some contemplated methods can include setting a threshold value by the user before the generating step; this can be accomplished by using a user-interface disposed in or on the vehicle.

Some embodiments can include the step of detecting a first force applied by the user to the handle, saving a first threshold value correlating to the first force, and assigning the first threshold value to a signal for actuating the horn at a first volume. Contemplated method can further include detecting a second force applied by the user to the handle, saving a second threshold value correlating to the second force, and assigning the second threshold value to a signal for actuating the horn at a second volume. Instead of different volume of horn sound, these different threshold values can also correlate to actuating horns of different tones.

With respect to the type of effective external force detectable by the force-sensing device, contemplated methods can sense a normal stress applied to the external force-sensing device. In another embodiment, the external force-sensing device can sense a shear stress applied to the force-sensing device.

Other ways to detect an effective external force can include providing a force-sensing device having a first section and a second section electrically separate from each other. In another embodiment, the force-sensing device can have more than two sections electrically separate from each other.

Contemplated methods can include determining whether the first section has detected the effective external force, and determining whether the second section has detected the effective external force. Contemplated methods can also generate a signal when both of the first section and the second section have detected an effective external force simultaneously.

Various objects, features, aspects and advantages of the present disclosure will become more apparent from the following detailed description of preferred embodiments of the disclosure, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as top, bottom, left, right, up, down, over, above, below, beneath, rear, front, distal, and proximal are used with respect to the accompanying drawings. Such directional terms should not be construed to limit the scope of the disclosure in any manner.

DETAILED DESCRIPTION

The disclosure and its various embodiments can now be better understood by turning to the following detailed description of the preferred embodiments, which are presented as illustrated examples of the disclosure defined in the claims. It is expressly understood that the disclosure as defined by the claims may be broader than the illustrated embodiments described below.

Although many of the embodiments below are described with respect to a steering wheel of an automobile, it should be understood that the disclosed systems and methods can be incorporated into other types of controllers of various machineries. Such machinery equipped with the contemplated controller can be a vehicle such as a land vehicle, a watercraft, an aircraft, an excavator, a forklift, etc., or a heavy machinery or stationary machine such as a cutting machine, a printing press, and an assembly line robotic arm. The various types of controllers can include, but are not limited to non-circular steering wheel, ship's wheel, handles on a ship's wheel, joystick, motorcycle handlebars, and any other drive by wire controllers.

Figure 1:
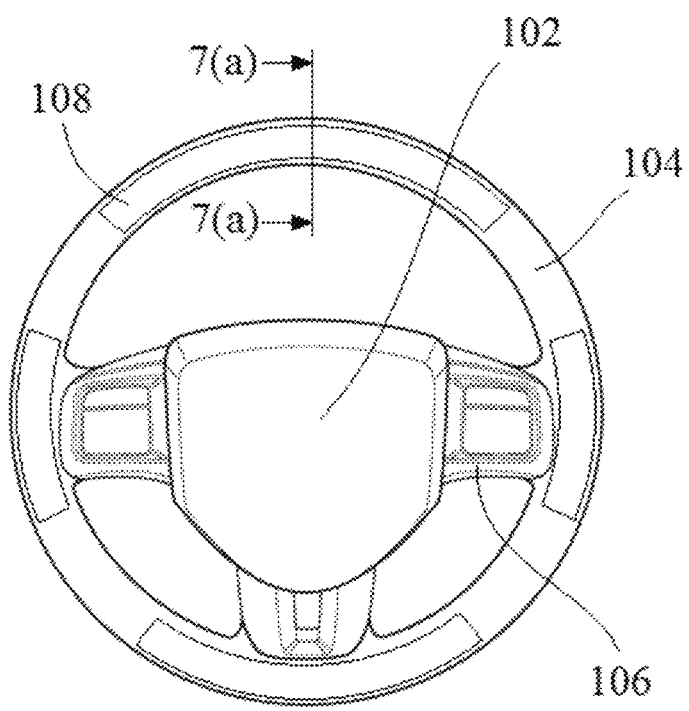
FIG. 1 is a front view of an embodiment of an exemplary steering wheel with horn-actuating handle according to an aspect of the disclosure.
Figure 2:
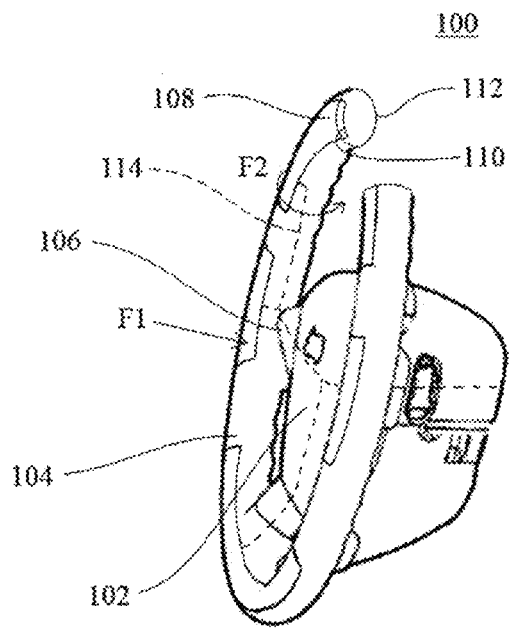
FIG. 2 is a perspective view of an embodiment of the steering wheel with horn-actuating handle of FIG. 1.

In one embodiment of the disclosure illustrated in FIGS. 1 and 2, an exemplary steering wheel 100 is shown. The steering wheel 100 can include a hub 102 configured to couple the steering wheel 100 to the steering column of a car. The steering wheel can have a handle 104 configured for a driver to hold when driving the car, and can have a spoke 106 connecting the hub 102 to the handle 104 so as to transmit a rotation of the handle 104 to the steering column via the hub 102. An external force-sensing device 108 can be arranged on the handle 104 and configured to electrically connect to a horn (not shown) of the car. The external force-sensing device 108 may have a plurality of pressure sensors to detect the force sourced from the driver. In some embodiments, the pressure sensors can include piezoelectric material. In other embodiments, instead of the plurality of pressure sensors, the external force-sensing device 108 can have plurality of mechanical buttons as a way to detect applied force. Indeed, the external force-sensing device 108 can sense external force applied to the steering wheel 100 using any suitable sensing methods and apparatuses including but not limited to mechanical means, electrical means, and pneumatic means.

In further embodiments, as shown in FIGS. 1, and 2, the external force-sensing device 108 on the handle 104 may include several electrically-separate sections disposed on the handle 104. Each of these sections can include at least one pressure sensor.

In yet other embodiments, the electrically separate sections can be disposed where the driver usually does not hold when driving or operating the machinery, and each of these sections can include at least one pressure sensors.

Returning now to FIGS. 1 and 2, the handle 104 can have a front side 110 and a rear side 112 opposite to each other. The front side 110 can be configured to face the driver. In this embodiment, the external force-sensing device 108 can be arranged on selected regions on the front side 110 as shown in FIG. 2. The external force sensed by the external force-sensing device 108 can be a normal stress F1 applied by the driver in a direction substantially perpendicular to the surface of the handle 104, that is, a compressive stress applied to the front side 110 in this embodiment. In another embodiment, the external forces can also be a shear stress F2 substantially parallel to the surface of the handle 104, or substantially circular surrounding a center axis of the handle 104. In contemplated embodiments, the driver may press, hit, or squeeze the external force-sensing device 108 to apply normal stress F1, or the driver can twist the external force-sensing device 108 to apply shear stress F2.

In one embodiment, there can be a wire 114 connecting the external force-sensing device 108 to the horn. The wire 114 can be embedded inside the steering wheel 100 and extend through the handle 104, spoke 106, and hub 102 sequentially.

Figure 3:
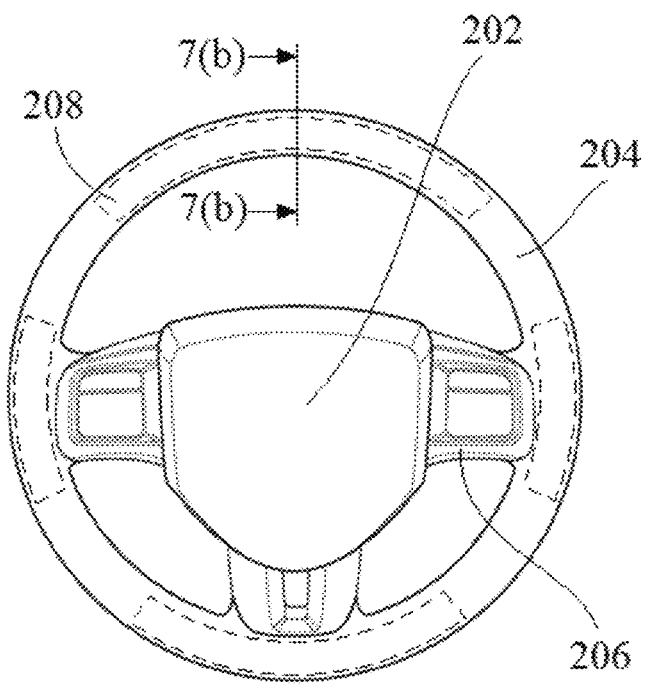
FIG. 3 is a front view of another embodiment of a steering wheel with horn-actuating handle according to an aspect of the disclosure.
Figure 4:
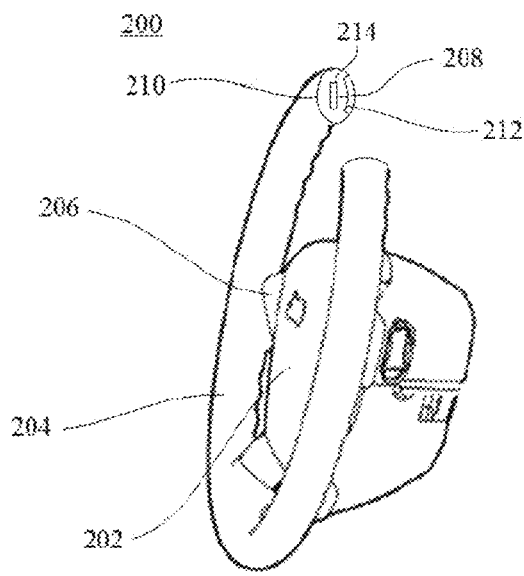
FIG. 4 is a perspective view of one embodiment of the steering wheel with horn-actuating handle of FIG. 3.

In yet another embodiment of the disclosure illustrated in FIGS. 3 and 4, an exemplary steering wheel 200 is shown. The arrangements of a hub 202, a handle 204, and a spoke 206 of the steering wheel 200 can be similar to those of the previously illustrated steering wheel 100 of FIGS. 1 and 2. Here, an external force-sensing device 208 of the steering wheel 200 can be disposed on the rear side 212 instead of on the front side 210. FIGS. 3 and 4 also illustrate another embodiment in which a wireless connection between the external force-sensing device 208 and the horn can be provided, using a paired wireless sender and receiver. Specifically, the external force-sensing device 208 may have a wireless sender 214 embedded inside the steering wheel 200, as shown in FIG. 4. The wireless sender 214 can electrically couple with a wireless receiver of the horn. In this way, signals can be transmitted from the external force-sensing devices 208 to the horn wirelessly when the external force-sensing device 208 senses an effective external force.

In this particular embodiment, a driver may squeeze the handle 204 in order to actuate the horn. The driver may also pull on the handle 204 in order to actuate the horn.

Figure 5:
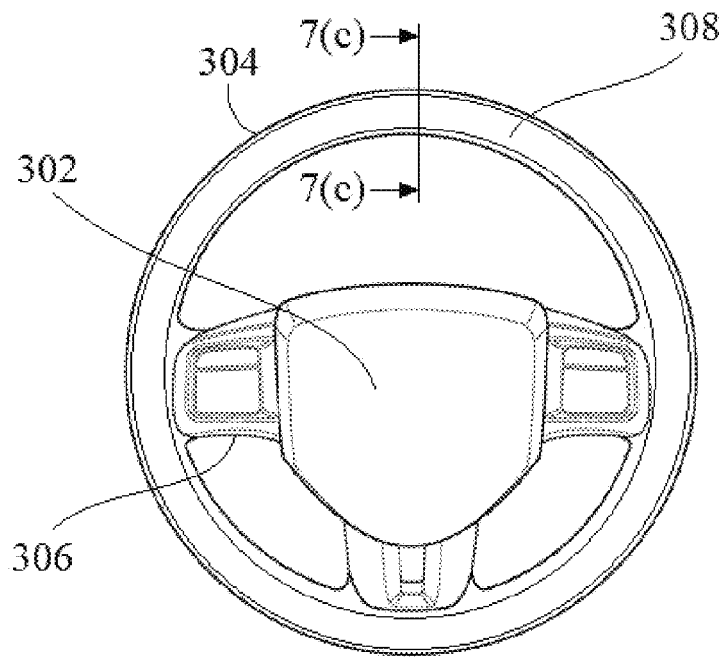
FIG. 5 is a front view of a yet another embodiment of a steering wheel with horn-actuating handle according to an aspect of the disclosure.

Referring to FIG. 5, a steering wheel 300 of yet another embodiment of the disclosure is shown. The steering wheel 300 can also include a hub 302, a handle 304, and a spoke 306, all of which can be similar to those of the steering wheel 100 of FIG. 1. However, in this embodiment, an external force-sensing device 308 of the steering wheel 300 can include a front section and a rear section respectively disposed on the front side and rear side of the handle 304, and each of the sections of the external force-sensing devices 308 can extend around the hub 302 by 360 degrees.

In other words, the external force-sensing device 308 can substantially cover the entire frontal and/or rear circumference of the handle 304.

Figure 6:
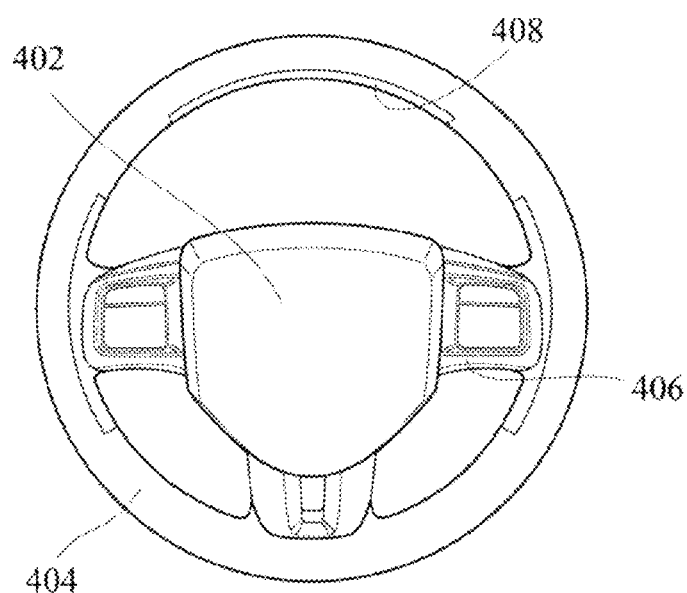
FIG. 6 is a front view of a further embodiment of a steering wheel with horn-actuating handle according to an aspect of the disclosure.

Referring to FIG. 6, a steering wheel 400 of a further embodiment of the disclosure is shown. The steering wheel 400 can include a hub 402, a handle 404, and a spoke 406, all of which can be similar to those of the steering wheel 100 of FIG. 1. However, in this embodiment, an external force-sensing device 408 of the steering wheel 400 can be arranged on an inward side of the handle 404, with the inward side facing the hub 402 and located between the front and rear sides of the handle 404.

Figure 7:
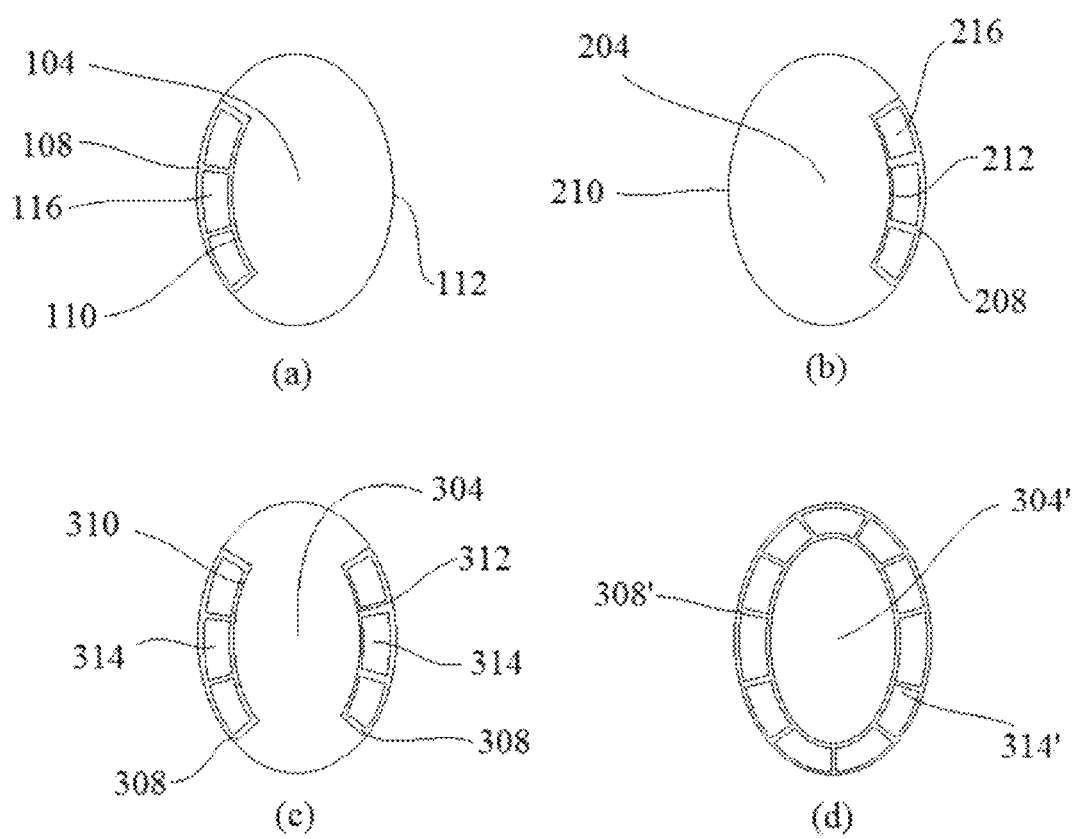
FIG. 7 shows sectional views of handles of different embodiments of the steering wheel.

In the above disclosed embodiments, the external force-sensing devices 108, 208, 308, 408 can include a plurality of external force-sensing devices. In FIG. 7, various arrangements of the external force-sensing device on the handle are shown by sectional views of the steering wheel handle thereof. As shown in FIG. 7, in (a), the external force-sensing device 108 of this particular embodiment can have a plurality of pressure sensors 116 on the front side 110 of the handle 104; in (b), the external force-sensing device 208 of this particular embodiment can include a plurality of pressure sensors 216 on the rear side 212 of the handle 204; in (c), each of the two sections of the external force-sensing device 308 can respectively be disposed on the front side 310 and rear side 312, and can include a plurality of pressure sensors 314. Furthermore, as shown in (d) of FIG. 7, an external force-sensing device 308 can include a plurality of pressure sensors 314' that wraps around the handle 304'. In some embodiments, the external force-sensing device 308' may extend around the handle 304' to cover all of the front, inward, rear, and outward sides of the handle 304'. In other embodiments, when any one of the pressure sensors is deformed, the deformation of the pressure sensor can generate a signal corresponding to the degree of the deformation.

Figure 8:
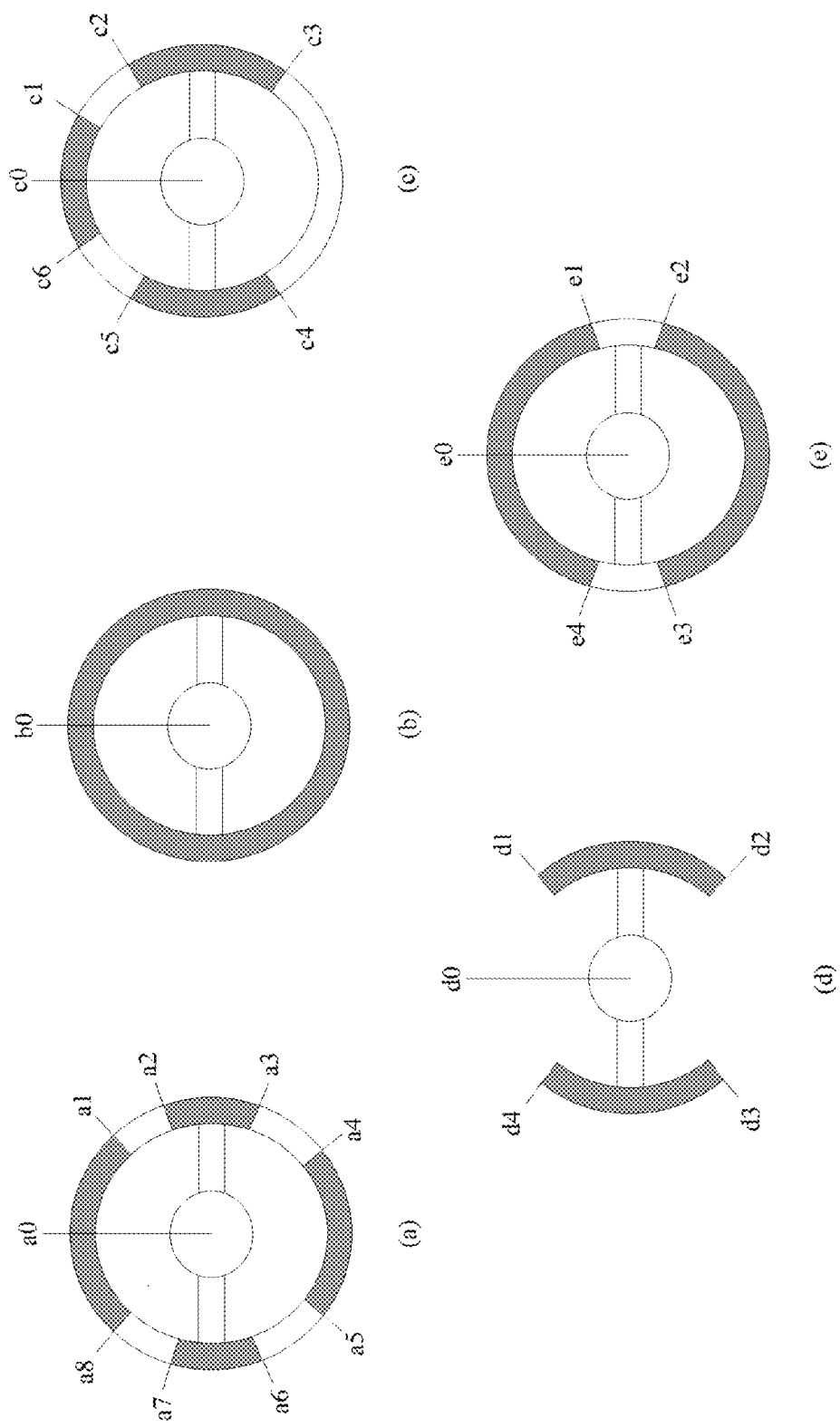
FIG. 8 shows schematic diagrams of coverage of external force-sensing devices over the handles of different embodiments of the steering wheel.

Referring now to FIG. 8, these schematic diagrams illustrate coverage of the external force-sensing device over the handle 204. In (a) of FIG. 8, a contemplated coverage of the external force-sensing device 108 over the handle 104 is shown, wherein the handle 104 can extend around the hub 102 by 360 degrees, and the external force-sensing device 108 can cover angular sections from a0 to a1 (46 degrees), from a2 to a3 (47.5 degrees), from a4 to a5 (75 degrees), from a6 to a7 (47.5 degrees), and from a8 to a0 (46 degrees). With the above arrangement, a coverage rate of the external force-sensing device 108 to the 360-degree-extending handle 104 can be about 72.8%. In (b) of FIG. 8, the contemplated coverage of the external force-sensing device 308 over the handle 304 is shown, wherein the handle 304 can extend around the hub 302 by 360 degrees, and the external force-sensing device 308 can cover the angular section from b0 to b0 (360 degrees). Thus, a coverage rate of the external force-sensing device 308 to the 360-degree-extending handle 304 can be 100%. In (c) of FIG. 8, the coverage of the external force-sensing device 408 over the handle 404 of another embodiment is shown, wherein the handle 404 can extend around the hub 402 by 360 degrees, and the external force-sensing device 408 can cover angular sections from c0 to c1 (30 degrees), from c2 to c3 (70 degrees), from c4 to c5 (70 degrees), and from c6 to c0 (30 degrees). With this contemplated arrangement, a coverage rate of the external force-sensing device 408 to the 360-degree-extending handle 404 can be about 55.6%.

In (d) of FIG. 8, the non-circular handle can extend around the hub by angles from d1 to d2 (85 degrees) and from d3 to d4 (85 degrees), and the external force-sensing device can cover the angular section from d1 to d2 and from d3 to d4. Thus, the coverage rate of the external force-sensing device to the 170-degree-extending handle can be 100%. Finally, an embodiment with a coverage of the external force-sensing device not including sections close to the spokes is shown in (e) of FIG. 8. The coverage rate of the external force-sensing device to the 360-degree-extending handle can be about 86.1%. In sum, in embodiments where the handle extends around the hub by a predetermined angle, a coverage rate of the external force-sensing device to the handle can be at least 50 percent of the predetermined angle. In other embodiments, the rate of coverage can be at least 60 percent of the predetermined angle. In yet another embodiment, the rate of coverage can be at least 80 percent of the predetermined angle. And still yet in other embodiments, the rate of coverage can be at least 90 percent of the predetermined angle. It should be understood that the above-described angles and coverage rates are exemplary and any other angles/coverage rates can be adopted in various embodiments of the disclosure.

Figure 9A:
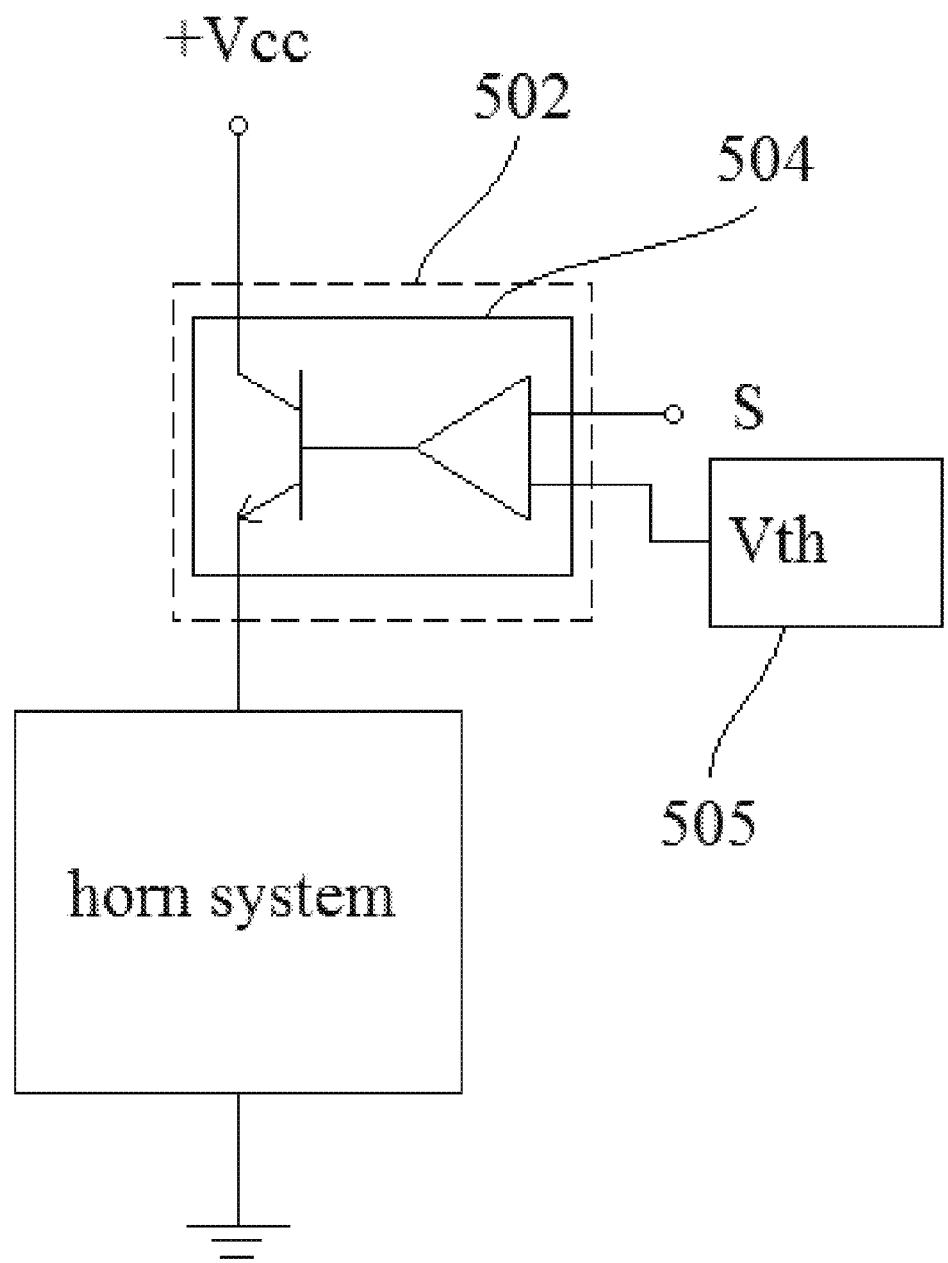
FIG. 9A is a circuit showing a threshold circuit to filter out an external force not greater than a predetermined threshold value, and also showing a user interface connecting to the threshold circuit.

In some the above embodiments, a signal outputted by the external force-sensing device 108, 208, 308, or 408 when it detects the external force can serve as an actuating signal to be directly sent to the horn to actuate the horn. In one particular embodiment, in order to avoid falsely sounding the horn, the contemplated steering wheel can further include an arrangement illustrated as follows. The pressure sensor can further have a controller to set a threshold value Vth, so that the pressure sensor will send an actuating signal to the horn when the sensed external force is larger than the threshold value Vth. In some embodiments, instead of using said pressure sensor with the controller, the horn may further have a comparator to block an actuating signal sourced from an external force not greater than the threshold value Vth. With either one of the above arrangements, the horn can only be actuated when the external force is greater than the threshold value Vth, which can be set as an effective external force. Turning now to FIG. 9A, the disclosed steering wheel of the disclosure may further include a threshold circuit 502 for filtering out signal induced by external force not greater than the threshold value Vth. Specifically, the threshold circuit 502 can include a switch assembly 504. This switch assembly 504 can have a comparator and an n-type transistor serving as a switch, wherein the n-type transistor can only be turned on when the base (gate) of this transistor receives a positive signal with a voltage level larger than the base-emitter (gate-source) voltage thereof. Structurally, in some embodiments, two input terminals of the comparator can electrically couple to the external force-sensing device and a threshold voltage generator 505, so as to respectively receive a signal S generated by the external force-sensing device and a threshold voltage corresponding to the threshold value Vth. In yet another embodiment, the base (gate) of the n-type transistor can connect with an output terminal of the comparator, and the collector (drain) or the emitter (source) of the n-type transistor can serially connect to the horn.

Specifically in one embodiment, the threshold voltage generator 505 can be a voltage generator outputting a threshold voltage which corresponds to the threshold value Vth to the threshold circuit 502 automatically. Alternatively, the threshold voltage generator 505 can further include a user interface for the driver to adjust the threshold value Vth according to individual usage. Moreover, the user interface can be located conveniently for driver access, such as on the dash board or at the center console of the car. In other embodiment the user interface can be located on the hub, spoke or handle of the steering wheel. The user interface can have a monitor screen and data entry keys or use other conventional data entry means. Additionally or alternatively, the user interface can be adapted to receive voice and/or gesture commands.

In operation of the threshold circuit 502, the comparator can generate the positive signal and transmit the positive signal to the switch when the voltage level of the signal S is greater than the threshold voltage generated by the threshold voltage generator 505 (for example, when the driver applies an effective external force to the external force-sensing device) so as to turn on the switch. When the switch is turned on, an actuating signal can be sent to and actuate the horn from the threshold circuit 502. Thus, with the threshold circuit 502, one embodiment of the steering wheel can actuate the horn when the external force-sensing device detects an effective external force. Furthermore, with the user interface of the threshold voltage generator 505, the threshold voltage generator 505 can be adjustable and customizable to the driver to adjust the threshold value Vth when necessary. Please note that the above structure of the switch assembly 504 is exemplary and any other arrangement can be adopted in various embodiments of the disclosure.

Figure 9B:
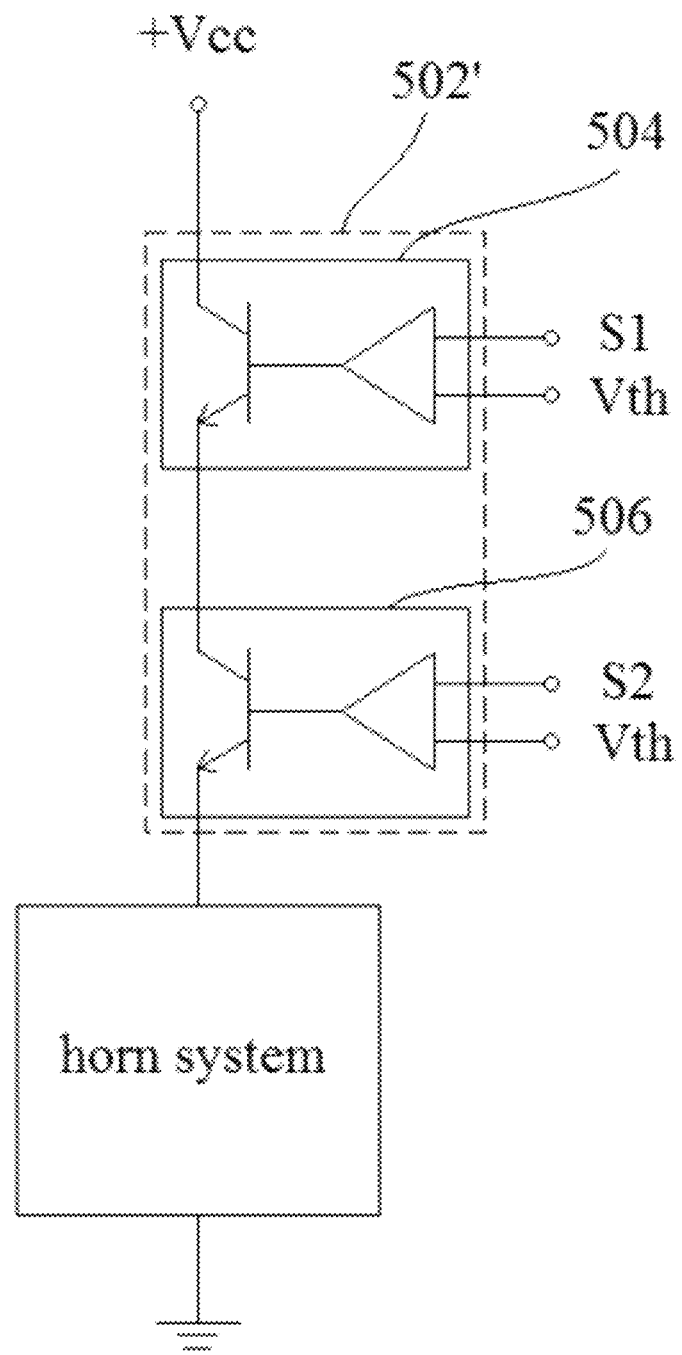
FIG. 9B is a circuit showing two serially connected threshold circuits which actuate the horn only if both of two electrically separate sections of the external force-sensing device simultaneously detect an external force greater than the predetermined threshold value.

With respect to FIG. 9B, instead of the threshold circuit 502, contemplated steering wheel of the disclosure may have a threshold circuit 502' including two switch assemblies 504, 506 in serial connection, so as to further avoid horn actuation in error. In one specific embodiment, when the external force-sensing device of the present steering wheel has two electrically separate sections, the two sections may respectively generate two separate signals S1, S2 due to the applied external force. For example, said electrically separate sections can be the sections of the external force-sensing device 108, 208 or 408, which can be peripherally separated. In other embodiments, said electrically separate sections can be the front section and the rear section of the external force-sensing device 308. As shown in FIG. 9B, the two switch assemblies 504, 506 can respectively connect with the two sections of the external force-sensing device to receive the signals S1, S2. Since the switch assembles 504, 506 of the threshold circuit 502' are in serial connection for this embodiment, the threshold circuit 502' can be turned on to send the actuating signal to the horn when both of the two electrically separate sections sense the external force and the external force is greater than the threshold value Vth. Namely, in this embodiment, the horn can operate when the driver applies the effective external force to both of the sections simultaneously.

Figure 9C:
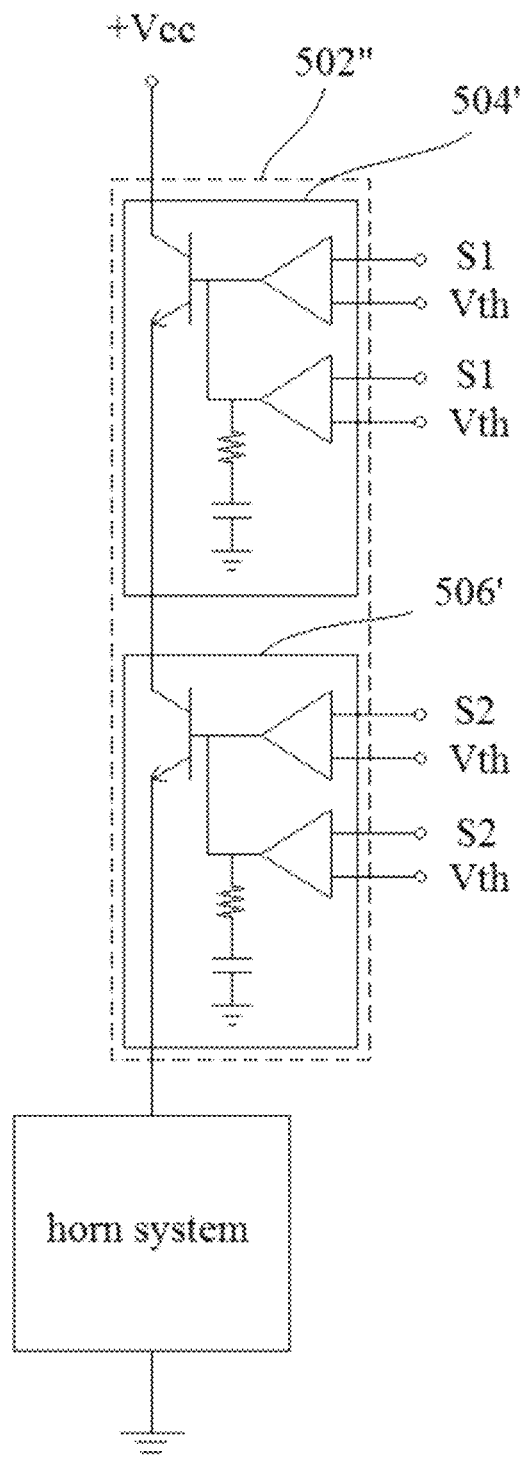
FIG. 9C is a circuit showing two serially connected threshold circuits which actuate the horn only if a time gap exists between a first time period wherein one of the two sections detects the effective external force and a second time period wherein the other section detects that the effective external force is smaller than a delay period.

In a further contemplated embodiment, as shown in FIG. 9C, another threshold circuit 502" also can include two switch assemblies 504', 506'. However, in addition to the comparator and the switch of the switch assembly 504, each of the switch assemblies 504', 506' can have a combination of a time delay circuit and another comparator connecting with the base (gate) of the switch. With said time delay circuit, the positive signal can last for a delay period after the signal S1 or S2 resulting in said positive signal stops. In other words, with the threshold circuit 502", although the driver does not apply the effective external force to both of the sections simultaneously, the horn may still be actuated. Particularly, both of the switch assemblies 504', 506' can still be turned on for transmitting the actuating signal to the horn if a time gap between a first time period wherein one of the two sections detects the effective external force and a second time period wherein the other section detects the effective external force is smaller than the delay period. In one example, in order to avoid falsely sounding the horn, the delay period can be set as one second.

Figure 10:
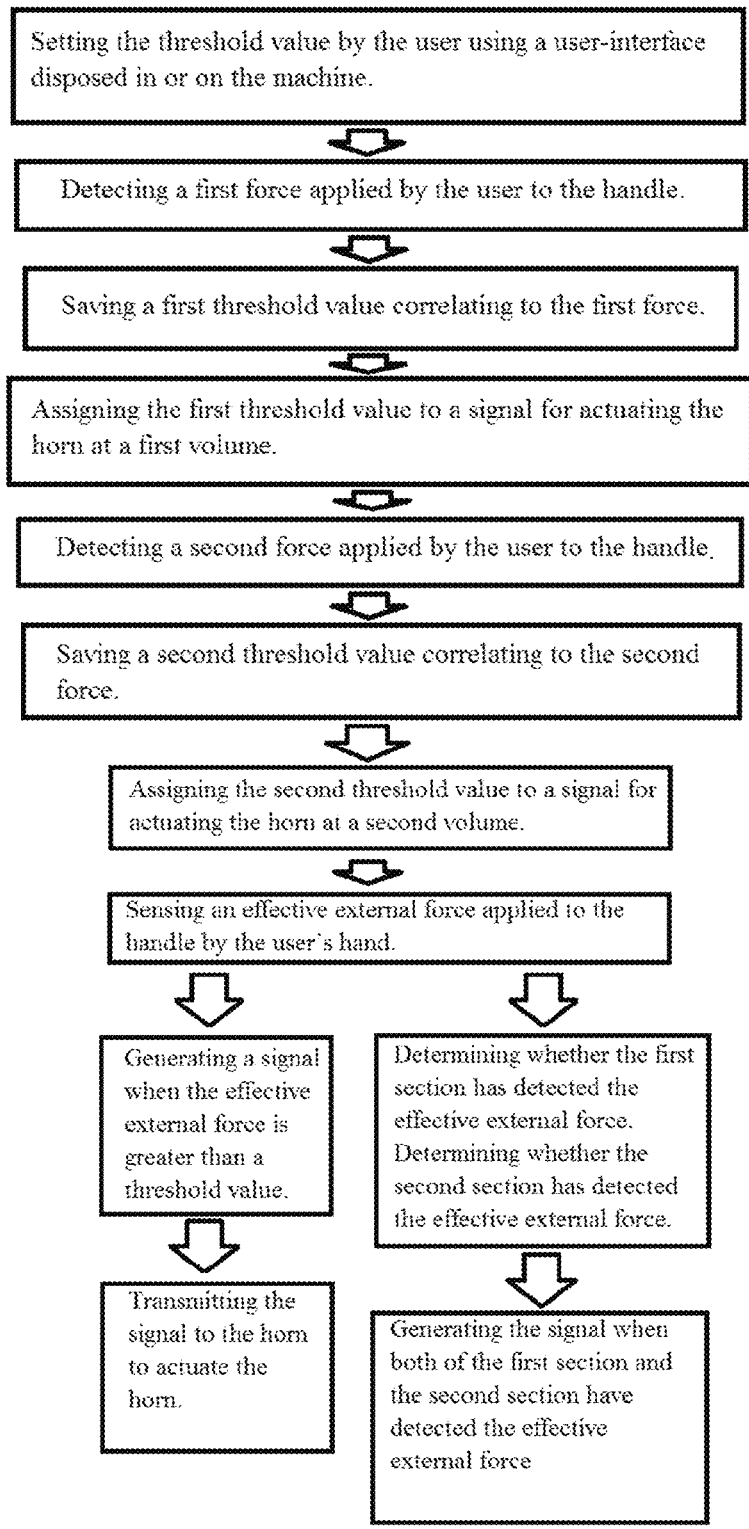
FIG. 10 is a flow chart of an operation method of the embodiments of a steering wheel with horn-actuating handle according to an aspect of the disclosure.

FIG. 10 shows a flow chart of exemplary steps in some contemplated embodiments. In many embodiments, the contemplated methods of sounding a horn can involve using a controller handle to a machine wherein the handle has an external force-sensing device disposed on the thereon, and the same handle is being used to drive/operate the machine, and the contemplated methods allows the driver/operator of the machine to actuate a horn without having to release one or both of his or her hands from the steering wheel handle. In other words, the driver/operator can continue to drive the vehicle and actuating a horn while keeping his or her hands on the steering wheel handle.

The illustrated example includes first setting a threshold value by the user via a user interface disposed in or on the machine. As discussed above, the user interface can be conveniently located at the dash board, the center console, or directly on the controller handle. Optionally, the user interface can have a monitor screen and data entry keys or using other data entry means. In one embodiment, the user interface can be voice-controlled. The contemplated user interface allows a driver to customize his or her setting according to his or her preference.

Contemplated methods can include detecting a first force applied by the user to the handle. For example, the user interface can prompt the driver to squeeze the steering wheel with one hand or two hands to indicate an appropriate level of force (and/or number of hands) needed to actuate a low volume horn sound. And once the user squeezes the steering wheel lightly with both hands, the user interface can next ask the driver whether or not he or she would like to save that particular setting (i.e., a two-hand squeeze of a particular magnitude of force) for a "low-volume" horn.

The confirmation step can be optional in some embodiments before the setting can be saved. For example, a first threshold value can be saved in response to a first light squeeze, and assigned with a signal for actuating the horn at a low volume. From this point on, whenever the user squeezes with both hands at the steering wheel with a force above this first threshold value, a light-volume horn can be actuated.

In some embodiments, the user interface allows a user to set one volume, or one type of horn tone. In other embodiments, the user interface can allow a user to set more than one volume of horn sound and/or more than one tone of horn sound. Other embodiments of the user interface may allow customization based on different users who share the same car. The vehicle/machine can automatically detect (e.g., through fingerprint detection at the steering wheel, door handle, shifter, etc., weight detection by sensors embedded in driver's seat, or via other biometric measures such as voice detection/matching) which driver is behind the wheel and apply the specific customized setting for that particular driver.

Optionally, a driver can set a loud volume horn by applying a second force to the handle in response to a prompt by the vehicle/machine. The prompt can be displayed on a screen or communicated via a speaker. When the driver then applies a second, more forceful squeeze with both hands, the second force can be detected. As discussed above, the user interface may prompt the driver whether or not the second threshold value corresponding to the second force is to be saved for a "high-volume" horn sound. If confirmed, this second threshold value (e.g., a more forceful two-hand squeeze of a particular magnitude) correlating to the second force can be saved. Thereafter, the second threshold value can be used for triggering a signal for actuating the horn at a higher, loud volume. In this way, when the driver squeezes with both hands with a force at or higher than the second threshold value, the horn can sound louder than the horn actuated at the first threshold value.

While a "squeeze" is the exemplary type of effective external force discussed herein, it should be understood that many other types of effective external force can be detectable by the contemplated force-sensing device, such as a normal stress and a shear stress applied to the force-sensing device.

The contemplated embodiments may include sensing an effective external force applied to the handle by the user's hand, and generating a signal when the effective external force is greater than a threshold value. Also included can be transmitting the signal to the horn to actuate the horn.

In some embodiments, the contemplated methods can include using a force-sensing device having multiple electrically separate zones. For example, the force-sensing device can have a first section and a second section electrically separate from each other and located on different regions of the steering wheel.

Contemplated methods can include determining whether the first section has detected the effective external force, and determining whether the second section has detected the effective external force. Also contemplated is generating a signal when both of the first section and the second section have detected an effective external force simultaneously, or substantially at the same time.

Many alterations and modifications may be made by those having ordinary skill in the art without departing from the spirit and scope of the disclosure. Therefore, it must be understood that the illustrated embodiments have been set forth only for the purposes of example and that they should not be taken as limiting the disclosure as defined by the following claims. For example, notwithstanding the fact that the elements of a claim are set forth below in a certain combination, it must be expressly understood that the disclosure includes other combinations of fewer, more or different elements, which are disclosed herein even when not initially claimed in such combinations.

What is claimed is:

1. A steering wheel, comprising:
   a handle configured for a driver to hold;
   a hub configured to couple the handle of the steering wheel to a steering column of a car; and
   an external force-sensing device arranged on the handle of the steering wheel and configured to electrically connect to a horn of the car, wherein the external force-sensing device comprises two sections electrically separate from each other, and wherein:
   the external force-sensing device has a plurality of pressure sensors;
   the external force-sensing device is flexible and wrapped around the handle of the steering wheel; and
   wherein a threshold circuit connects with the two sections of the external force-sensing device, and the threshold circuit is configured to be turned on when both of the two sections of the external force-sensing device detect an effective external force at the same time, with the effective external force greater than a threshold value.

2. The steering wheel of claim 1, wherein the pressure sensors are made of piezoelectric material.

3. The steering wheel of claim 1, wherein the pressure sensors are configured to detect an external force applied to the external force-sensing device by sensing a deformation of at least one of the pressure sensors.

4. The steering wheel of claim 1, wherein the handle has an inward side facing the hub, and the external force-sensing device is arranged on the inward side of the handle.

5. The steering wheel of claim 1, wherein the handle has a front side and a rear side opposite to each other, the front side is configured to face the driver and the external force-sensing device is disposed on the rear side of the handle.

6. The steering wheel of claim 1, wherein the handle has a front side and a rear side opposite to each other, the front side is configured to face the driver, and the external force-sensing device comprises two sections respectively arranged on the front side and the rear side of the handle.

7. The steering wheel of claim 1, further comprising a user interface configured to receive input from the driver to set the threshold value.

8. The steering wheel of claim 1, wherein the external force-sensing device comprises a wireless sender configured to send a signal to a wireless receiver of the horn.

9. A method of sounding a horn using a steering wheel of a vehicle, wherein the steering wheel includes an external force-sensing device electrically coupled to the horn, the method comprising:
 sensing, by one or more pressure sensors of the external force-sensing device that is flexible and wrapped around a handle of the steering wheel, an effective external force applied to the handle of the steering wheel by a user's hand, wherein the external force-sensing device includes a first section and a second section electrically separated from each other, and the method further comprises:
  determining whether the first section has detected the effective external force;
  determining whether the second section has detected the effective external force; and
  generating a signal when both of the first section and the second section have detected the effective external force simultaneously; and
 transmitting the signal to the horn to actuate the horn.

10. The method of claim 9, further comprising:
 detecting a first force applied by the user to the steering wheel;
 saving a first threshold value correlating to the first force; and
 assigning the first threshold value to a first signal for actuating the horn at a first volume.

11. The method of claim 10, further comprising:
 detecting a second force applied by the user to the steering wheel;
 saving a second threshold value correlating to the second force; and
 assigning the second threshold value to a second signal for actuating the horn at a second volume.

12. The method of claim 9, wherein the effective external force is at least one of a normal stress or a shear stress applied to the external force-sensing device.

13. A controller to a machine, comprising:
 a handle configured for a user to hold by one or two hands to operate the machine; and
 an external force-sensing device arranged on the handle and configured to electrically couple to a horn of the machine;
 wherein:
  the force-sensing device is configured to send a signal to the horn to sound the horn, triggered by an effective external force applied on the handle;
  the external force-sensing device includes a plurality of pressure sensors;
  the external force-sensing device is flexible and wrapped around the handle; and
  wherein the external force-sensing device further comprises two sections electrically separated from each other, and a threshold circuit coupled to the two sections of the external force-sensing device, wherein the threshold circuit is configured to be turned on when both of the two sections of the external force-sensing device detect the effective external force when the effective external force is greater than a threshold value.

14. The controller of claim 13, wherein the controller is coupled to a user interface disposed in or on the machine, and the user interface is configured to receive input from the user to set the threshold value.

* * * * *